A. J. SAVAGE.
TIRE.
APPLICATION FILED MAY 21, 1915.
1,209,042. Patented Dec. 19, 1916.
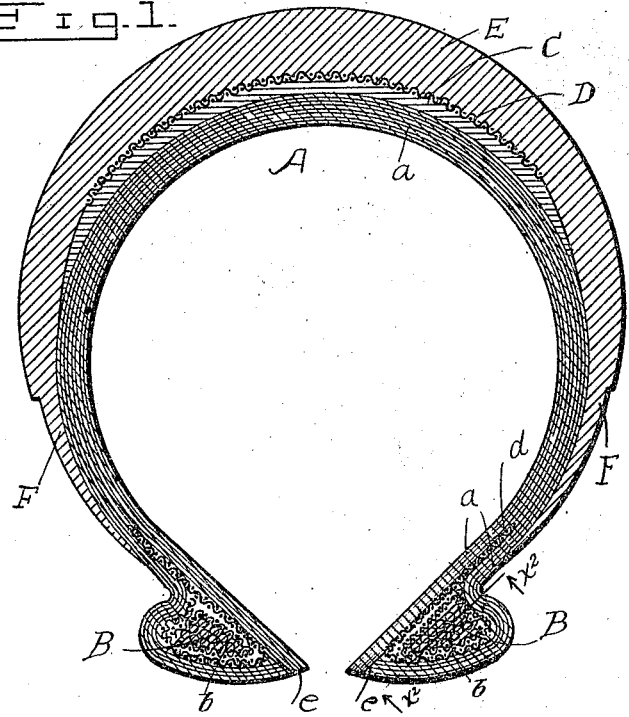
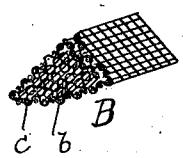
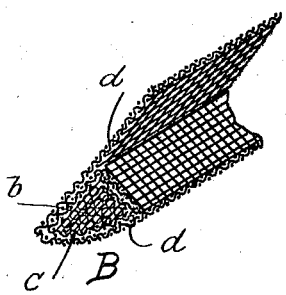
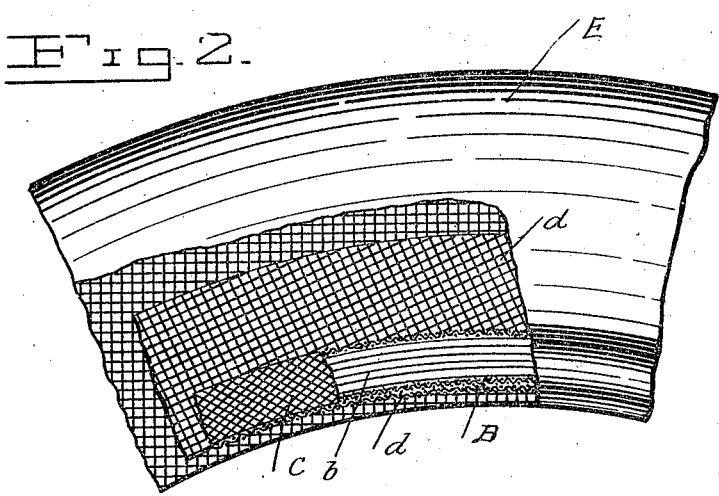
Witnesses,
H. Gearing.
Alfred H. Daehler.
Inventor,
Arthur John Savage,
By
His Attorney.

UNITED STATES PATENT OFFICE.

ARTHUR JOHN SAVAGE, OF SAN DIEGO, CALIFORNIA.

TIRE.

1,209,042.  Specification of Letters Patent.  Patented Dec. 19, 1916.

Application filed May 21, 1915. Serial No. 29,494.

*To all whom it may concern:*

Be it known that I, ARTHUR JOHN SAVAGE, a citizen of the United States, residing at San Diego, in the county of San Diego and State of California, have invented new and useful Improvements in Tires, of which the following is a specification.

This invention relates to tires, and more particularly to vehicle tires for automobiles and other motor vehicles, of built-up or composite structure, including elements of rubber, rubber substitute, textile fabric and the like. Such tires, or, in pneumatic tire practice, casings as they are called, comprise an arched body provided with beads which enter into the means for securing the tire to the rim of the wheel. It is of the utmost importance that there be a tough stable construction at the beads and the zones of junctions of the beads with the body of the tire, not only to insure positive securing relation as between the tire and the wheel rim, but to prevent breaking down of the tires at the rim-engaging portions. It is a further desideratum that the beads be so associated with the body or carcass of the tire that there be but a minimum of yield or bend between the beads and the remaining portions of the tire, so that a firm and positive interlocking engagement of the beads with the rim may be insured.

The present invention has for its object the provision of an improved tire in which the above factors will be particularly considered, and which, with other objects in view, will be generally superior in point of durability or length of life, inherent stability and relative simplicity and inexpensiveness of organization, taken in connection with general increased efficiency and serviceability.

The invention consists in the novel and useful provision, formation, construction, association and interrelation of parts, members and features, all as hereinafter described, shown in the drawing and finally pointed out in claims.

In the drawing: Figure 1 is a transverse sectional view of an improved tire constructed and organized in accordance with the invention; Fig. 2 is a fragmentary side elevation, upon a diminished scale, of the construction shown in Fig. 1, partly in section, upon the line $x^2$—$x^2$, Fig. 1, certain parts being broken away for purposes of fullness of illustration; Fig. 3 is a detail fragmentary sectional isometric view of a bead element entering into the tire construction shown in Figs. 1 and 2; and Fig. 4 is a view similar to Fig. 3, showing the addition or application of a further bead element.

Corresponding parts in all the figures are designated by the same reference characters.

Referring with particularity to the drawing, the improved tire shown therein comprises the usual carcass A consisting of a plurality of superposed layers or courses $a$ of rubber-impregnated fabric, which are brought down at the sides of the tire and united with the beads B, in accordance with the invention, as will hereinafter be disclosed. Over the carcass is applied the cushion layer C, over that the breaker strip of rubber-impregnated fabric D, and over that the tread E which merges into the side walls F which are brought down over the carcass.

The beads B comprise each an annulus having a core $b$ comprising continuous lengths of hemp or other fibrous material, the strands of which are associated with rubber or rubber compound, the entirety being wrapped in a textile sheath $c$, the entirety being molded into proper bead form, and then receiving an anchor strip $d$ one edge of which is lapped and folded about the core $b$ and ultimately intimately connected therewith. The sheath $c$ is preferably of textile material impregnated with rubber. The prepared bead B is then associated with the carcass A, the side edge portions of the layers $a$ of which will receive such anchor strip, as the carcass is built up. The carcass is then formed down upon, over and around the bead, with the anchor strip incorporated therein, and the ends of the carcass layers are brought together and trimmed off, as at $e$. The cushion C, breaker strip D and tread E with the side walls F are then added, and the tire is finished off and vulcanized and finally treated in accordance with the usual method of manufacture. The vulcanizing process thoroughly unites together all of the several structural elements of the tire, including the beads with their anchor strips $d$.

A tire so constructed is of great strength in the beads and in the zones of connection of the beads with the carcass. Pressure applied to the tire in service tends to strain upon the anchor strip in one direction, and in the outer surrounding carcass layers in the opposite direction, these forces opposing each other and neutralizing any tendency to rip or tear the beads loose from the carcass, thus adding great strength to the tire in the bead portions thereof, where such strength is highly desirable, due to the strains imposed upon these portions of the tire when connected with the rim.

It is manifest that many changes may be made with respect to the disclosure of the foregoing description and the drawing, in adapting the improvements to varying conditions of use and service, without departing from the fair spirit of the invention.

Having thus disclosed my invention, I claim and desire to secure by Letters Patent:

1. A tire provided with a built-up carcass, and with beads at the side edges thereof, there being separate anchorages for the beads extending therefrom and incorporated in the carcass structure.

2. A tire provided with a built-up carcass, and with beads at the side edges thereof, there being anchorages for the beads incorporated in the carcass structure; said anchorages comprising fabric strips bent about the beads and extended beyond the beads between courses of the carcass construction.

3. A tire provided with a built-up carcass, and with beads at the side edges thereof, there being anchorages for the beads incorporated in the carcass structure, each of said beads comprising an annulus consisting of a plurality of separate strands; and a fabric sheath for said strands; each of said beads being provided with a fabric strip raised above the bead and extending beyond the same and constituting said anchorage.

4. An improved tire provided with a carcass comprising a plurality of associated layers, and a bead applied to the carcass and disposed between certain of said layers; said bead being provided with an anchorage extending therefrom between certain of said layers.

In testimony whereof, I have signed my name to this specification in the presence of two subscribing witnesses.

ARTHUR JOHN SAVAGE.

Witnesses:
 WILLIAM BUDD KELLEY,
 HAROLD W. DILL.